United States Patent [19]
Phillips et al.

[11] Patent Number: 5,722,348
[45] Date of Patent: Mar. 3, 1998

[54] SMALL ANIMAL GLOBULAR HOUSING MODULE

[75] Inventors: Gerald Phillips, Wantagh; Johnny Davila Gonzalez, Long Beach; Marvin Goldman, North Hills, all of N.Y.

[73] Assignee: Penn-Plax, Inc., Garden City, N.Y.

[21] Appl. No.: 665,791

[22] Filed: Jun. 18, 1996

[51] Int. Cl.$^6$ ..................................................... A01K 1/03
[52] U.S. Cl. .......................................... 119/452; 119/421
[58] Field of Search ..................................... 119/452, 417, 119/421, 482, 462, 464, 702, 704, 707

[56] References Cited

U.S. PATENT DOCUMENTS

| | | | |
|---|---|---|---|
| 122,138 | 12/1871 | Suppernio | 119/452 X |
| 2,681,638 | 6/1954 | Carvell | 119/452 X |
| 3,653,357 | 4/1972 | Sheidlower et al. | 119/421 X |
| 3,687,110 | 8/1972 | Braunhut | 119/421 X |
| 3,859,961 | 1/1975 | Willinger et al. | 119/452 X |
| 3,994,262 | 11/1976 | Suchowski et al. | 119/452 X |
| 4,171,682 | 10/1979 | Merino et al. | 119/452 X |
| 4,235,196 | 11/1980 | Moliterni | 119/464 |
| 4,250,833 | 2/1981 | Waldon | 119/421 X |
| 5,092,269 | 3/1992 | Phillips et al. | 119/452 |
| 5,116,255 | 5/1992 | Keeling et al. | 119/702 X |
| 5,186,122 | 2/1993 | Phillips et al. | 119/474 |

Primary Examiner—Gene Mancene
Assistant Examiner—Yvonne R. Abbott
Attorney, Agent, or Firm—Nikaido, Marmelstein, Murray & Oram LLP

[57] ABSTRACT

A small animal globular housing and exercise module including a main body which is formed by two hemispherical body pieces fabricated from a transparent thermoplastic material. A lid opening, large enough to accommodate a human hand, is formed in one of the body pieces and a lid removably closing the lid opening is provided. Ventilation openings of sufficient size and number to allow for air passage through the module are provided. A pair of through openings are formed opposite to each other and are positioned along and split by a division plane defining the two hemispheres for possible passage of small animals therethrough, each opening having an outwardly protruding portion. Annular connecting rings engage the protruding portions of each opening passage and hold the two body pieces together. A pair of bubble caps are engaged by a side of each annular ring opposite to a side engaging the protruding portions of the through openings. Instead of the bubble caps, the annular rings can be attached to other small animal living accessories such as, tunnel tubes or tunnel tees connected to other enclosures. Alternatively, racing caps can replace the annular rings and bubble caps. The lid has an interior surface and a symmetrical cruciform groove can be defined on that interior surface. In such a case, the module further includes a wire grid sized to span an interior of the module and having an end shaped to engagingly fit in two arms of the cruciform groove.

12 Claims, 3 Drawing Sheets

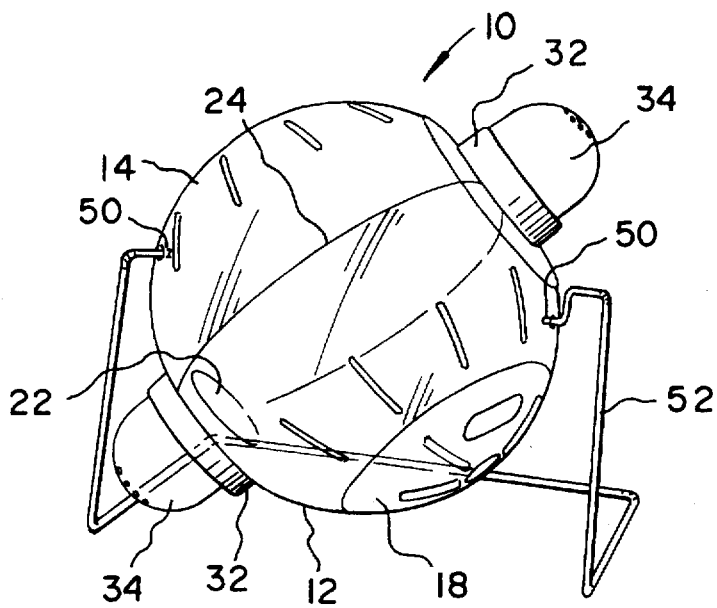
FIG. 1
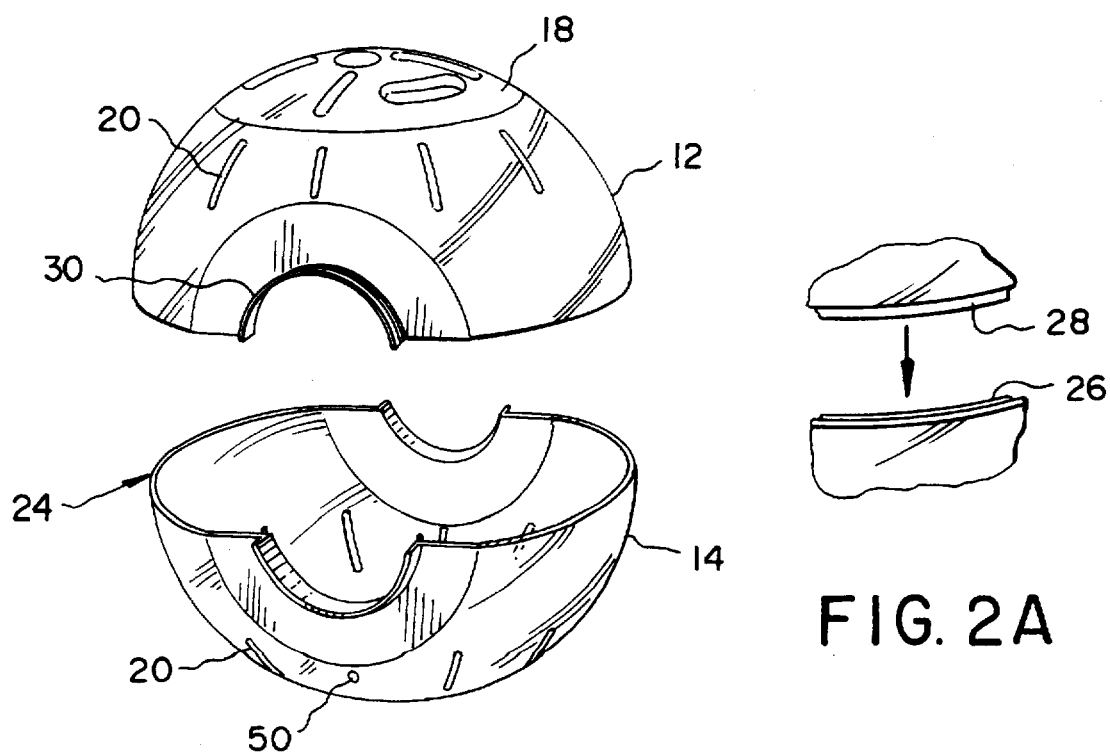
FIG. 2
FIG. 2A

SMALL ANIMAL GLOBULAR HOUSING MODULE

BACKGROUND OF THE INVENTION

The present invention relates to an improved enclosure toy and environment habitat accessory for use by home hobbyists to maintain and enjoy small animals such as hamsters, gerbils and mice. Small animal enclosures and toys have been known and used in both the home and laboratory setting for any years. See for example; U.S. Pat. Nos. 5,186,122 and 5,092,269 to Phillips et al, both of which are incorporated herein by reference. More particularly, the present invention provides a small animal housing module and toy with advantageous features which make it easier to maintain and more fun for the home hobbyist to keep these animals.

It is commonly known that home hobbyists enjoy the ability to connect an assortment of enclosure modules and accessories, such as exercise wheels and feeders, to a main enclosure unit. Such a feature provides the hobbyist with the ability to customize the animals home into interesting and aesthetically pleasing configuration. This feature also allows the animal to move more freely through an enlarged environment and to encounter a variety of challenges to enhance exercise and well being.

It is also known that since animals such as hamsters and gerbils are naturally active, curious animals, it is beneficial to provide them with various exercise devices. Clear plastic roller balls are known. The present invention provides an aesthetically more pleasing configuration and a more interesting wobble action than a purely round roller ball, but is adaptable to act as a round roller ball or "squirrel cage" type exerciser when desired.

SUMMARY OF THE INVENTION

It is an object of the present invention to provide a small animal globular housing and exercise module which allows ease of use and cleaning as well as amusing fun for the home hobbyist. It is a further object of the present invention to provide a small animal globular housing and exercise module which is easily connected to tunneling tubes, accessories, and additional housing modules. It is a still further object of the present invention to provide a small animal globular housing and exercise module which can also be used as a conventional roller ball exercise device.

The present basic unit invention is a small animal globular housing and exercise module which is a main body formed by two hemispherical body pieces fabricated from a transparent thermoplastic material. This material can be tinted to various degrees to provide a better or different appearance. A lid opening, large enough to accommodate a human hand, is formed in one of the body pieces and a lid removably closing the lid opening is provided. Ventilation openings of sufficient size and number to allow for air passage through the module are provided. A pair of through openings are formed opposite to each other and are positioned along and split by a division plane defining the two hemispheres for possible passage of small animals therethrough, each opening having an outwardly protruding portion. Connecting means connectible to the protruding portion of each opening passage are provided for holding the two body pieces together. The connecting means can be annular connecting rings engaging the protruding portions of each opening passage and holding the two body pieces together. A pair of bubble caps can be engaged by a side of each annular ring opposite to a side engaging the protruding portions of the through openings. Instead of the bubble caps, the annular rings can be attached to other small animal living accessories such as, tunnel tubes or tunnel tees connected to other enclosures. Alternatively, racing caps having annular ring portions can replace the annular rings and bubble caps. Each of the two hemispherical body pieces can have a hole defined therein at a position offset from the division plane. The present invention can also include a wire stand having ends insertable into the holes and suspending the main body at a position above a horizontal surface enabling rotation of the module about an axis defined by a line through the holes. When the bubble caps are in place with the connecting means, this gives a very interesting visual wobble effect upon rotation.

The lid has an interior surface and a symmetrical cruciform groove can be defined on that interior surface. In such a case, the module further includes a wire grid sized to span an interior of the module and having an end shaped to engagingly fit in two arms of the cruciform groove. The cruciform groove can be defined on the interior surface by integrally molded, radially inwardly extending wall portions.

BRIEF DESCRIPTION OF THE DRAWINGS

The above and other objects and advantages of the present invention will become readily apparent by reference to the following detailed description when considered in conjunction with the accompanying drawings wherein:

FIG. 1 is an perspective view of a small animal globular housing and exercise module set up for stationary rotation illustrating an embodiment of the present invention.

FIG. 2 is an exploded view of the two hemispherical body pieces forming the main body of the present invention.

FIG. 2A is a partial detailed view showing the interconnection between the two body pieces of FIG. 2.

Like reference numerals refer to like parts throughout the several views of the drawings.

DETAILED DESCRIPTION OF THE INVENTION

Figure 3:
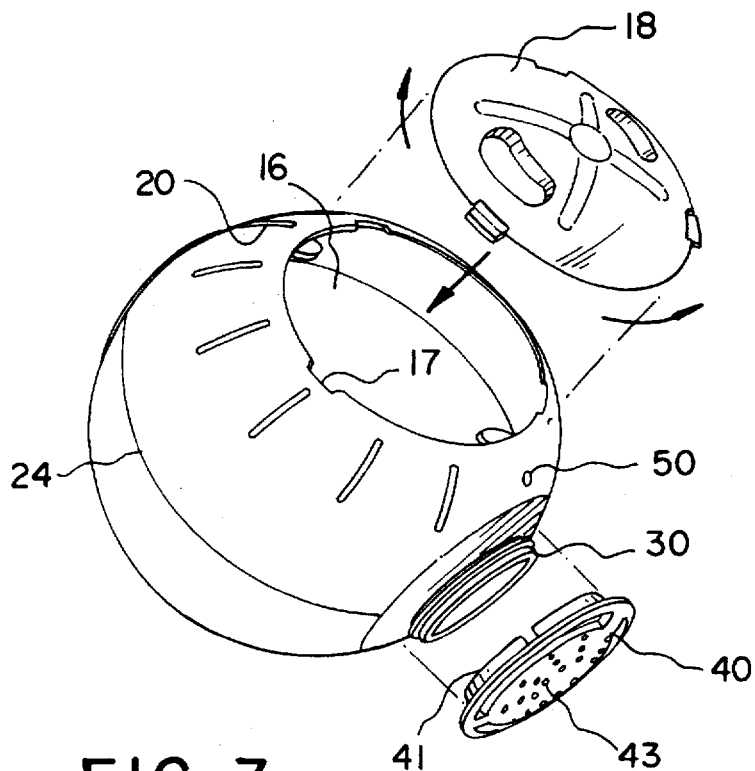
FIG. 3 shows how the lid fits into the lid opening in one of the body pieces and shows racing caps engageable on the protruding portions of the through openings to hold the body pieces together.

FIG. 1 shows an embodiment of the present invention as a small animal globular housing and exercise module set up for stationary rotation. It includes a main body 10 formed of two hemispherical body pieces 12, 14 fabricated from a transparent thermoplastic material. This material can be tinted to various degrees to provide a better appearance. As shown in FIG. 2, the body pieces 12 and 14 are defined by a division plane 24. One of the body pieces has a radially inward axially extending lip 28 which engages with a radially outwardly positioned lip 26 on the edge of the other of the body pieces as shown in FIG. 2A. The particular structure at the lip edges of the body pieces is necessary to ensure that no relative lateral movement occurs between the pieces when joined. Both of the body pieces 12, 14 are provided with suitable ventilation openings 20 of sufficient size and number to allow for air passage through the main body 10, yet small enough to prevent the paws of the small animals from being trapped.

Figure 4:
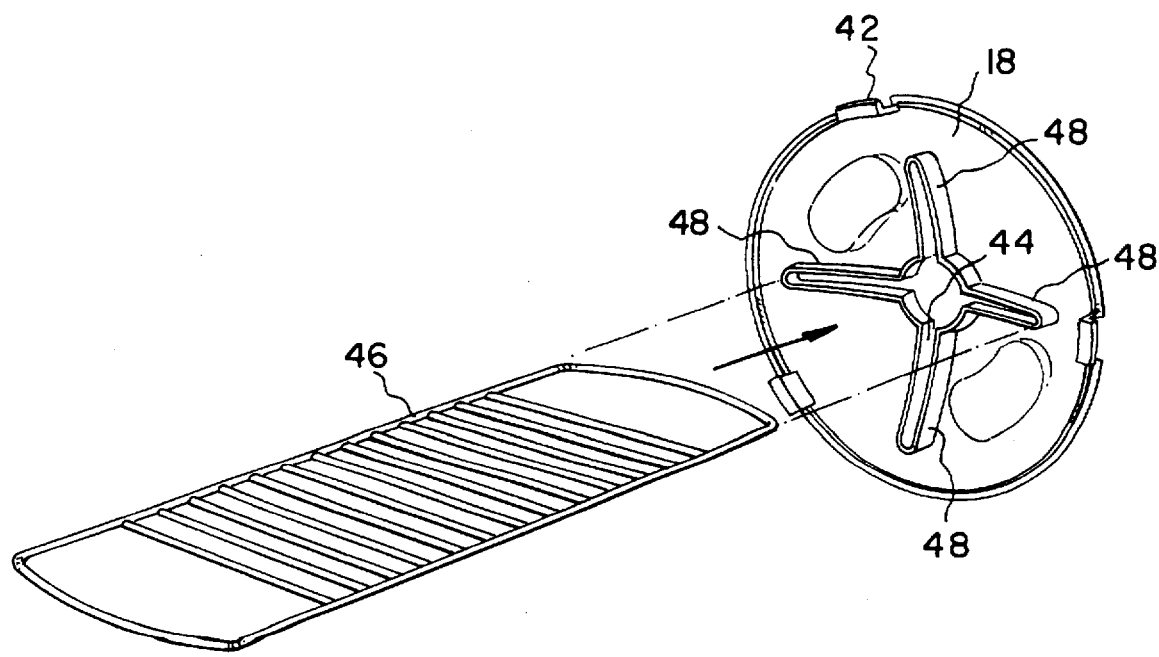
FIG. 4 is a detail view of the lid showing the cruciform groove and the auxiliary wire grid.

One of the body pieces 12 is formed with a lid opening 16, large enough to accommodate a human hand. For structural strength purposes, this lid opening 16 is generally formed along an axis perpendicular to the division plane 24. A lid 18 is provided for removable closing the lid opening. As shown in FIGS. 3 and 4, the lid 18 is provided with axially extending engaging arms 42 which in a bayonet-like connection engage in slots 17 formed on the sides of the lid opening 16. This form of structure for locking the lid 18 onto the body piece 12 is known. Thus, no further description of it is considered necessary.

The body pieces 12, 14, are provided with through openings 22 formed opposite to each other and positioned along and split by the division plane defining the two hemispherical body pieces as shown in FIG. 2. Each opening 22 has an outwardly protruding portion 30. The outwardly protruding portion 30 may have linking lips radially extending outwardly therefrom.

Connecting means connectible to the protruding portion 30 of each opening passage 22 are provided for holding the two body pieces 12, 14 together. That is, when the body pieces 12, 14 are engaged together at the lips 26, 28, a connecting means is provided over the outwardly protruding portions 30 of the openings 22 which hold the pieces 12, 14 together to form the main body 10.

Figure 5:
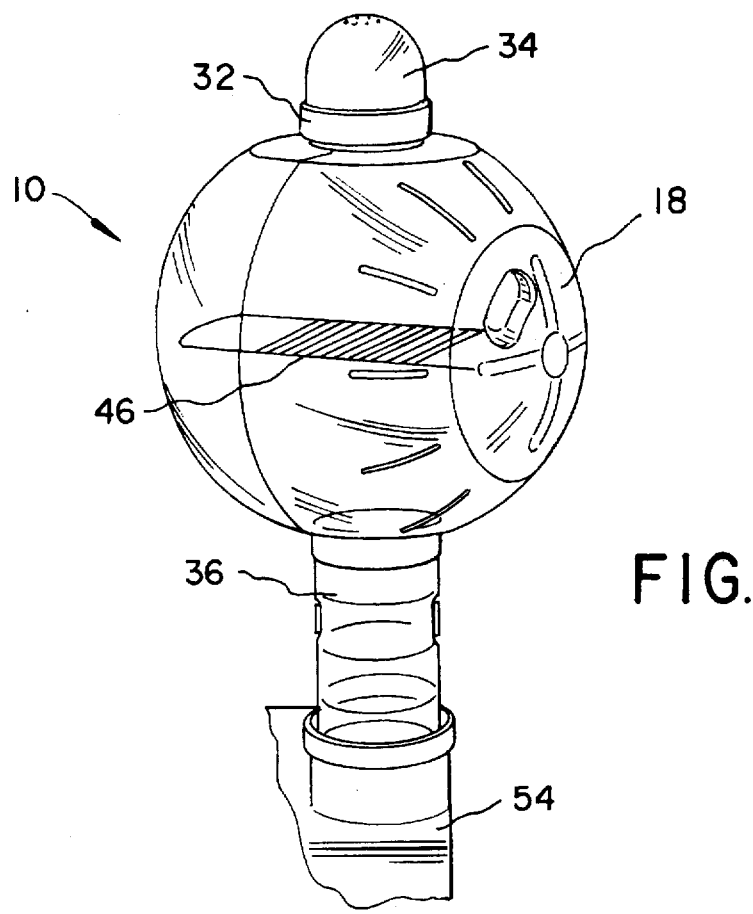
FIG. 5 is a perspective view of the present invention with one bubble cap being utilized as a tower top.
Figure 6:
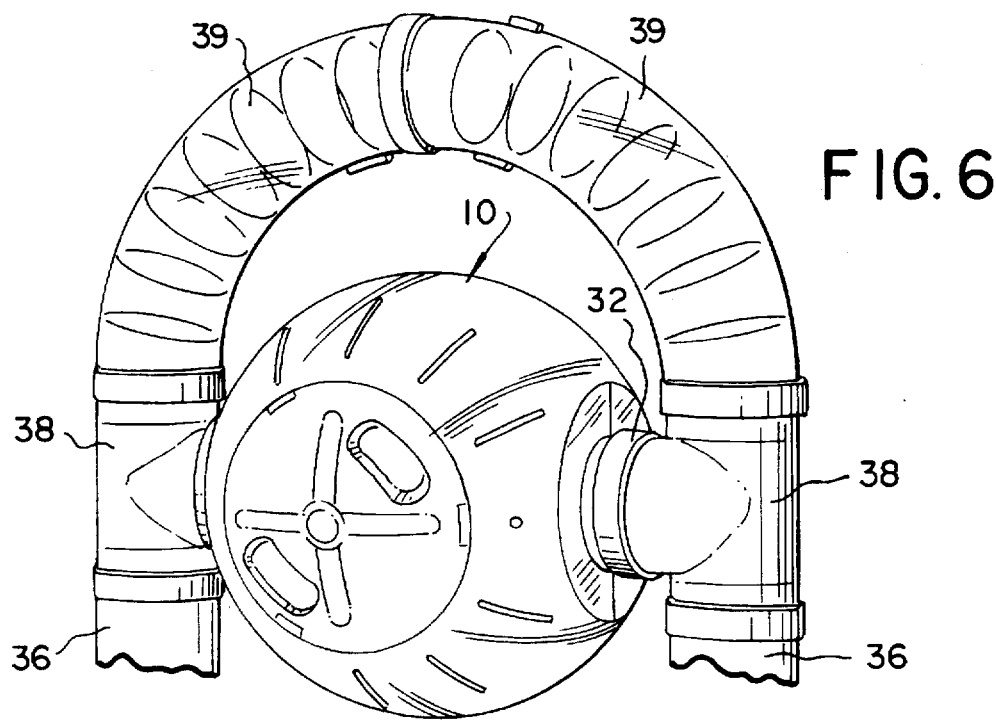
FIG. 6 is a perspective view of the present invention connected between two tunnel tees which in turn are connected by a pair of quarter round tubes.

The connecting means can comprise a linking ring or annular ring 32 engaging the protruding portions 30. In addition, the connecting means can further comprise a small animal living accessory, such as those shown in U.S. Pat. Nos. 5,092,269 and 5,186,122, both to Phillips et al, both herein incorporated by reference. Such a small animal accessory would be engaged by a side of the annular ring 32 opposite to a side engaging the protruding portions 30 as shown in FIGS. 1, 5 and 6. The small animal living accessory can be a bubble cap 34 as shown in FIG. 1 and as set forth in the above referenced patents. Alternatively, the small animal living accessory could be a tunnel tube 36 connected to another animal enclosure 54 as shown in FIG. 5. Or, the small animal living accessory could be a tunnel tee 38 in turn connected to a pair of tunnel tubes 36 and a pair of quarter round tubes 39 as shown in FIG. 6. Such tubes are clearly set forth in the above-referenced patents.

It is known that some hobbyists enjoy watching their small animals roll about in roller balls. In fact, it has been said that certain hobbyists will race their small animals in such roller balls.

The present invention when provided with annular ring type connecting means 32 and a pair of bubble caps 34 provide a unique and enjoyable exercise module for the small animal hobbyist which gives a very interesting wobble effect upon rotation by the actions of the small animal within the module. Alternatively, should the hobbyist wish to have the module operate as a conventional roller ball, the connecting means can comprise a racing cap 40 shown in FIG. 3 having an axially inwardly directed annular ring portion 41 engaging the protruding portions 30 of the through openings. The racing cap 40 can be provided with ventilation openings 43.

When used as a housing module, such as shown in FIGS. 5 and 6, it may be desirable to have an interior platform in the main body 10. In this regard, the lid 18 having an interior surface can be provided with a groove 44 on that surface.

The present invention further contemplates a wire grid 46 sized to span an interior of the main body 10 and have an end which is shaped to engagingly fit in the groove 44. The groove 44 can be defined on the interior surface of the lid 18 by integrally molded, radially inwardly extending wall portions 48, clearly shown in FIG. 4. This groove 44 can be formed as a symmetrical cruciform groove having four arms. The wire grid 46 would fit into two of these arms of the cruciform groove. Having the groove in this shape enables a more arbitrary placement of the wire grid 46 and of the main body 10 as shown in each of FIGS. 5 and 6.

Additionally, the present invention contemplates having each of the body pieces have a hole 50 defined therein at a position offset from the division plane 24. The module can further comprise a wire stand 52 shown in FIG. 1 having ends which are insertable into the holes 50. This suspends the main body 10 at a position above a horizontal surface enabling rotation of the module about an axis defined by a line through the holes 50. When equipped with connecting means as annular rings 32 and bubble caps 34, a quite amusing wobbling effect occurs upon straight forward rotation of the module about the axis defined between the holes 50.

Because of the division of the main body 10 into the two hemispherical body pieces 12, 14, the module of the present invention is very simple to clean. Yet with the provision of the lid 18 and the lid opening 16, it is easy to place the small animal into and out of the module. The provision of the connecting means as an annular ring and bubble cap combination provides a unique and enjoyable exercise device whether rolling freely about on a horizontal surface or rotating about a single axis on a wire stand. Further, the present invention is adaptable as a round roller ball or squirrel cage type exerciser when desired by utilizing the racing caps. Still further, the present invention provides a unique and enjoyable small animal globular housing module easily connected to tunneling tubes, accessories and additional housing modules which are known in the art.

It is readily apparent that the above described small animal environment meets all of the objectives mentioned as well as providing other advantages for maintaining small animals. It should be understood that the specific form of the invention here and above described is intended to be representative only, as certain modifications within the scope of these teachings will be apparent to those skilled in the art of small animal care.

Accordingly, reference should be made to the following claims in determining the full scope of the invention.

What is claimed is:

1. A small animal globular housing and exercise module comprising:

a main body formed of two hemispherical body pieces fabricated from a transparent thermoplastic material;

a lid opening, large enough to accommodate a human hand, formed in one of said body pieces;

a lid removably closing said lid opening;

ventilation openings of sufficient size and number to allow for air passage through the module;

a pair of through openings for possible passage of small animals therethrough, each opening having an outwardly protruding portion, each through opening being formed opposite to each other and positioned along and split by a division plane defining said two hemispherical body pieces; for connecting means connectible to the protruding portion of each opening passage for holding said two body pieces together.

2. A small animal globular housing and exercise module according to claim 1, wherein said connecting means comprises an annular ring engaging said protruding portions.

3. A small animal globular housing and exercise module according to claim 2, wherein said connecting means further comprises a small animal living accessory engaged by a side of said annular ring opposite to a side engaging said protruding portions.

4. A small animal globular housing and exercise module according to claim 3, wherein said small animal living accessory is a bubble cap.

5. A small animal globular housing and exercise module according to claim 3, wherein said small animal living accessory is a tunnel tube.

6. A small animal globular housing and exercise module according to claim 3, wherein said small animal living accessory is a tunnel tee.

7. A small animal globular housing and exercise module according to claim 1, wherein said connecting means comprises a racing cap having an annular ring portion engaging said protruding portions.

8. The small animal globular housing and exercise module according to claim 1, wherein said lid has an interior surface and a groove defined on said interior surface, and said module further comprises a wire grid sized to span an interior of said main body and having an end shaped to engagingly fit in said groove.

9. The small animal globular housing and exercise module according to claim 8, wherein said groove is defined on said interior surface by integrally molded, radially inwardly extending wall portions.

10. The small animal globular housing and exercise module according to claim 8, wherein said groove is a symmetrical cruciform groove and said end of said wire grid fits into two arms of said cruciform groove.

11. The small animal globular housing and exercise module according to claim 1, wherein each of said two hemispherical body pieces has a hole defined therein at a position offset from said division plane, and said module further comprises a wire stand having ends insertable into said holes and suspending said main body at a position above a horizontal surface enabling rotation of said module about an axis defined by a line through said holes.

12. A small animal globular housing and exercise module comprising:

a main body formed of two hemispherical body pieces fabricated from a transparent thermoplastic material;

a lid opening, large enough to accommodate a human hand, formed in one of said body pieces;

a lid removably closing said lid opening;

ventilation openings of sufficient size and number to allow for air passage through the module;

a pair of through openings for possible passage of small animals therethrough, each opening having an outwardly protruding portion, each through opening being formed opposite to each other and are positioned along and split by a division plane defining said two hemispheres;

annular connecting rings engaging the protruding portions of each opening passage for holding said two body pieces together; for a bubble cap engaged by a side of each said annular ring opposite to a side engaging said protruding portions.

* * * * *